(12) United States Patent
Manley et al.

(10) Patent No.: US 7,988,903 B2
(45) Date of Patent: Aug. 2, 2011

(54) FAST CURING VULCANIZABLE MULTI-PART ELASTOMER COMPOSITION, AND PROCESS FOR BLENDING, INJECTION MOLDING AND CURING OF ELASTOMER COMPOSITION

(75) Inventors: Paul E. Manley, Louisville, KY (US); Charles T. Smith, English, IN (US)

(73) Assignee: Zeon Chemicals L.P., Louisville, KY (US)

( * ) Notice: Subject to any disclaimer, the term of this patent is extended or adjusted under 35 U.S.C. 154(b) by 0 days.

(21) Appl. No.: 12/167,243

(22) Filed: Jul. 2, 2008

(65) Prior Publication Data

US 2010/0001435 A1 Jan. 7, 2010

(51) Int. Cl.
*B29C 45/46* (2006.01)
*B29C 45/53* (2006.01)

(52) U.S. Cl. ................................ 264/328.6; 425/543
(58) Field of Classification Search .................. 264/552, 264/236, 347, 328.6; 425/543
See application file for complete search history.

(56) References Cited

U.S. PATENT DOCUMENTS

| | | | |
|---|---|---|---|
| 3,878,285 A * | 4/1975 | Souffie | 264/328.2 |
| 3,989,793 A * | 11/1976 | Hertel et al. | 264/328.4 |
| 4,197,381 A * | 4/1980 | Alia | 525/222 |
| 4,431,776 A | 2/1984 | Honsberg | |
| 4,543,385 A * | 9/1985 | Agarwal et al. | 524/518 |
| 4,588,752 A | 5/1986 | Kmiec et al. | |
| 4,848,920 A * | 7/1989 | Heathe et al. | 366/339 |
| 4,960,819 A | 10/1990 | Sandstrom et al. | |
| 5,002,995 A | 3/1991 | Saito et al. | |
| 5,008,345 A | 4/1991 | Wolf | |
| 5,023,278 A * | 6/1991 | Fisher et al. | 521/85 |
| 5,079,304 A | 1/1992 | DeMarco | |

(Continued)

FOREIGN PATENT DOCUMENTS

CA 2558901 A1 3/2007

(Continued)

OTHER PUBLICATIONS

International Search Report and Written Opinion for International application PCT/US09/48525.

*Primary Examiner* — Joseph S Del Sole
*Assistant Examiner* — Ryan Ochylski
(74) *Attorney, Agent, or Firm* — McLeland Patent Law Office, P.L.L.C.

(57) ABSTRACT

A multi-part rubber compound comprising:
(1) a first compound comprising an elastomer (1)(a) and a vulcanizing agent, and having a $t_s2$ of at least 1.5 minutes;
(2) a second compound comprising an elastomer (2)(a) and a cure accelerator, and having a $t_s2$ of at least 1.5 minutes; and
(3) one or more optional compound comprising an elastomer (3)(a) and having a $t_s2$ of at least 1.5 minutes;
wherein:
at least one of (1)(a), (2)(a) and (3)(a) has a Mooney viscosity of 20-75 measured at 100° C. (ASTM D1646),
the first, second and optional compounds are kept separate until the multi-part compound is used,
a blend of equal volumes of the first and second compounds, optionally with an equal volume of the optional compound, has a $t_s2$ of less than 0.7 minutes,
$t_s2$ being measured at 190° C. (ASTM D2084),
and a process for blending, injection molding and curing a rubber compound by injecting combined streams of rubber compounds from an injection chamber at a pressure of at least 10,000 psi into a motionless mixer provided downstream.

5 Claims, 5 Drawing Sheets

U.S. PATENT DOCUMENTS

| | | | |
|---|---|---|---|
| 5,162,425 A | 11/1992 | Sandstrom et al. | |
| 5,180,629 A * | 1/1993 | Terada et al. | 428/220 |
| 5,239,000 A * | 8/1993 | Kim et al. | 525/133 |
| 5,384,366 A * | 1/1995 | Paganelli | 525/133 |
| 5,538,677 A * | 7/1996 | Takahashi | 264/221 |
| 5,904,887 A | 5/1999 | Nakamura et al. | |
| 6,280,175 B1 * | 8/2001 | Saki et al. | 425/543 |
| 6,300,421 B1 | 10/2001 | Blok et al. | |
| 6,379,603 B1 * | 4/2002 | White et al. | 264/328.2 |
| 6,387,313 B1 * | 5/2002 | Chang et al. | 264/328.2 |
| 6,630,086 B1 | 10/2003 | Goral et al. | |
| 6,821,111 B2 * | 11/2004 | Vogliano et al. | 425/543 |
| 7,008,699 B2 | 3/2006 | Jourdian et al. | |
| 7,033,528 B1 * | 4/2006 | Walter et al. | 264/51 |
| 7,534,103 B2 * | 5/2009 | Weyand et al. | 425/543 |
| 2001/0011117 A1 | 8/2001 | Pesch et al. | |
| 2003/0057606 A1 | 3/2003 | Brix et al. | |
| 2003/0191233 A1 | 10/2003 | Lin et al. | |
| 2005/0017412 A1 * | 1/2005 | Maier et al. | 264/328.17 |
| 2005/0034802 A1 * | 2/2005 | Shirasaka et al. | 152/564 |
| 2005/0089696 A1 * | 4/2005 | Bosshammer | 428/447 |
| 2006/0108706 A1 * | 5/2006 | Galimberti et al. | 264/211.23 |
| 2007/0100053 A1 * | 5/2007 | Chapman et al. | 524/474 |
| 2007/0167553 A1 * | 7/2007 | Westwood et al. | 524/451 |
| 2007/0246862 A1 | 10/2007 | Jones et al. | |

FOREIGN PATENT DOCUMENTS

| | | |
|---|---|---|
| JP | 55093437 A * | 7/1980 |
| JP | 61121903 A | 6/1986 |
| JP | 2000263594 A | 9/2000 |
| RU | 2276168 C2 | 1/2006 |
| RU | 2296784 C2 | 4/2007 |
| WO | WO 2006008164 A2 * | 1/2006 |

* cited by examiner

FAST CURING VULCANIZABLE MULTI-PART ELASTOMER COMPOSITION, AND PROCESS FOR BLENDING, INJECTION MOLDING AND CURING OF ELASTOMER COMPOSITION

BACKGROUND OF THE INVENTION

The present invention relates to a fast curing vulcanizable multi-part elastomer composition particularly suitable for injection molding. The invention also provides a process for blending, injection molding and curing of an elastomer composition to form an article.

In the rubber industry an elastomer composition is also commonly referred to as a "rubber compound". A rubber compound is a blend of at least one elastomeric polymer (also referred to as "elastomer" or "rubber") with a curing agent (or a combination of "curatives" as defined below), optionally with one or more filler, and additives such as antioxidants, antiozonants, lubricants, process aids, activators, oils, plasticizers, etc. A rubber compound typically is produced by blending the elastomer with the fillers and additives by mechanical means, usually an internal mixer or an open mill. To the resulting blend, also known as the "master batch", a curing agent (or vulcanizing agent) and a cure rate accelerator are added. This combination of the vulcanizing agent and the accelerator is commonly referred to as the "curatives." During conventional rubber processing, the "master batch" is combined with the "curatives" to form a homogenous mixture, known as the "finished compound", which is ready to be formed and vulcanized into a finished article by an end user of the rubber compound. As mentioned above, the blending of the masterbatch and the curatives is typically carried out in an internal mixer or on an open mill. Since the elastomers used to produce rubber compounds typically have high molecular weights, the mixing of these materials generates considerable heat due to shear force. This heat may cause premature vulcanization or "scorch" since these rubber compounds, known as "accelerated compounds" at this stage, contain the cure rate accelerators as well as the vulcanization agent. Therefore, the mixing equipment is usually cooled to prevent premature vulcanization.

In a typical injection press operation a single rubber compound is fed, in the form of a single strip or strand or multiple strips or strands of the same compound, into the feed zone which contains a transport mechanism. This transport mechanism has a single purpose which is to move the compound into the injection holding chamber while warming up the compound, but not up to molding temperatures. The compound fills the injection holding chamber which is typically at a slightly higher temperature than the transport part of the injection press. The compound remains in the injection holding chamber until a portion of the compound is injected into the mold. After the mold is opened, the molded article is removed and the empty mold is closed, another portion of the rubber compound is injected into the mold.

In injection molding of rubber compounds, premature vulcanization or scorch prior to completion of the formation of the rubber compound into the desired article by molding causes defects in the properties of the molded product. In an ideal system for injection molding the rubber compound could be warmed up enough to have maximum flow without starting the cure reaction. This compound would be injected into the cavity of a mold which is set at a curing temperature. The amount of time available for the rubber compound to fill out the mold before vulcanization takes place is the "flow time", which may be represented by the time measured in minutes for the viscosity of a rubber compound to increase by a certain number of units when measured by a Mooney shearing disk viscometer at a constant temperature, typically from 100° C. to 125° C. In practice, the flow time may be measured by the time for a rubber compound to fill out the cavity of a mold under conditions of constant temperature and pressure. The time elapsed for the Mooney viscosity to increase by 5 units is the Mooney $t_5$ time, which may be used as a measure of the induction time for vulcanization or the scorch time of the rubber compound.

The curing properties of a rubber compound are traditionally measured by monitoring its torque using an Oscillating Disk Rheometer (ODR) at a curing temperature in the range of 150~200° C., which is higher than the temperature at which the Mooney viscosity is measured. A rubber sample at room temperature (known as "cold rubber") is placed in the instrument and the torque is measured as a function of time. The cold rubber offers resistance to the oscillating disk, which results in a spike in torque. This spike is referred to as the initial torque. As the sample warms up to curing temperature the sample becomes softer and the torque decreases. Then the sample begins to cure, which is shown by an increase in torque. A measure of the induction time for vulcanization is $t_s2$, which is the time for the torque to increase by 2 units. As vulcanization proceeds the torque continues to increase until it reaches a maximum value. This maximum value is referred to as MH (maximum torque). The time to reach 90% of this increase in torque is referred to as t'90. A greater t'90 value means a longer cure time for the rubber compound. An ideal rubber compound would exhibit a Mooney $t_5$ of at least 5 minutes for maximum scorch safety, a $t_s2$ of between 0.7 and 1.2 minutes for ideal flow, with a short t'90 for fast cycle time. As a general rule of thumb, the longer the induction time (as measured by $t_s2$) a compound has means a longer cure time (as measured by t'90.) Compounds with $t_s2$ values of less than 0.6 minutes and Mooney $t_5$ values of less than 3 minutes are considered "scorchy" and difficult to process. Such a compound would undergo rapid cross-linking before the compound has completely filled the cavity of a mold. Compounds with long $t_s2$ values greater than 1.5 minutes would have a difficult time curing in 1 minute, which is an economically desirable cure time.

To minimize scorch or premature curing, rubber compounds are formulated to have a slow cure rate either through the use of chemical cure rate retarders or through judicious selection of accelerators.

At the completion of the molding process the obtained article must be allowed to undergo complete curing by holding the molded article for a period of time under curing conditions, such as a sufficiently elevated temperature for a sufficient amount of time.

Not all compounds can be economically vulcanized in an injection press; therefore a secondary vulcanizing step (or post-cure) may be required. This "post-cure" may be carried out by holding the molded article inside the mold or press for an extended period of time, but doing so has a drastic, negative economic impact on production rates. It is more economical to remove the molded article prior to complete vulcanization, and subject it to an additional curing step outside the mold or press. Even though it is more economical than post-curing inside the press, this additional curing step outside the press also adds significantly to the cost and reduces the efficiency of the molding process.

An ideal rubber compound would exhibit a Mooney $t_5$ of at least five minutes for maximum scorch safety and ideal flow, with a short t'90 for fast cycle time. As a rule of thumb, the longer the scorch time (as measured by Mooney $t_5$) a compound exhibits usually translates into a longer cure time (as measured by t'90.) Compounds with Mooney $t_5$ values of less than 3 minutes are considered "scorchy" and difficult to process. Compounds with Mooney $t_5$ values of 3 minutes or more are processed more easily, but with the disadvantage of requiring a longer cure time.

A rubber compound having the ideal flow and curing properties described above has not been realized. The present invention resulted from the inventors' efforts to develop a rubber compound that approximates the properties of an ideal rubber compound, particularly for use in injection molding, and to develop an improved process for blending, injection molding and curing of a rubber compound.

SUMMARY OF THE INVENTION

The invention provides a fast curing vulcanizable multi-part rubber compound which is particularly suitable for injection molding. The invention also provides an improved process for forming an article by injection molding of a multi-part rubber compound.

The fast curing vulcanizable multi-part rubber compound of the invention comprises:

(1) a first rubber compound comprising: (a) an elastomer, and (b) at least one vulcanizing agent, this first rubber compound having a $t_s2$ value of at least 1.5 minutes when measured at 190° C.;

(2) a second rubber compound comprising: (a) an elastomer, and (b) at least one cure accelerator, this second rubber compound having a $t_s2$ value of at least 1.5 minutes when measured at 190° C.; and (3) one or more optional additional rubber compound comprising (a) at least one elastomer, this optional additional rubber compound having a $t_s2$ value of at least 1.5 minutes when measured at 190° C.;

wherein:

the elastomer (1)(a) and the elastomer (2)(a) are the same, or belong to the same family of elastomers, and the vulcanizing agent (1)(b) and the accelerator (2)(b) together function as a cure system for the elastomers (1)(a) and (2)(a), at least one elastomer selected from the group consisting of the elastomer (1)(a), the elastomer (2)(a) and the elastomer (3)(a) has a Mooney viscosity in the range of 20-75, preferably 20-50, and more preferably 30-50, as measured at 100IC in accordance with ASTM D1646, the first rubber compound, the second rubber compound and the optional additional rubber compound are kept separate from each other until the fast-curing vulcanizable multi-part rubber compound is used, a blend of equal volume parts of the first rubber compound and the second rubber compound, optionally with an equal volume part of the optional additional rubber compound, has a $t_s2$ value of less than 0.7 minutes, each $t_s2$ value being measured with an oscillating disk rheometer (ODR) in accordance with ASTM D2084.

In the process of the invention, the separate rubber compounds are fed as simultaneous streams into an injection molding machine provided with a motionless mixer (also known as a static mixer) in which the rubber compounds are thoroughly blended just before being injected into a mold to form a molded article. An advantage of the process of the invention is that although premature vulcanization or scorch is avoided, the molded article is sufficiently cured at the end of the injection molding process that very little or no post-curing of the article is required. Greatly increased efficiency and cost savings are therefore achieved by using the process and the multi-part rubber compound of the invention.

In the multi-part rubber compound of the invention, each of the first rubber compound, the second rubber compound, and the optional additional rubber compound is slow curing, as evidenced by a $t_s2$ value of at least 1.5 minutes, so each can be processed without premature vulcanization. When the first rubber compound is blended with the second rubber compound and the optional additional rubber compound, the resulting blend is a fast curing rubber compound, as evidenced by a $t_s2$ value of less than 0.7 minutes. Conventional rubber compounding does not envision such fast curing vulcanizable rubber compound for injection molding because it would undergo premature vulcanization and would not be useful for injection molding. The present invention solves the problem of premature vulcanization associated with fast curing rubber compounds, while retaining the advantages associated with using fast curing rubber compounds in injection molding, namely a more rapid and economical molding process. Another advantage of the multi-part rubber compound of the invention is that it has a long storage life since the accelerator is separated from the vulcanization agent until the compound is used in a molding operation.

DESCRIPTION OF THE INVENTION

The fast curing vulcanizable multi-part rubber compound of the invention comprises a first rubber compound, a second rubber compound, and optionally an additional rubber compound which are kept as separate parts until they are combined immediately prior to use, in particular for injection molding. More specifically, the fast curing vulcanizable multi-part rubber compound of the invention comprises:

(1) a first rubber compound comprising: (a) an elastomer, and (b) at least one vulcanizing agent, this first rubber compound having a $t_s2$ value of at least 1.5 minutes when measured at 190° C.;

(2) a second rubber compound comprising: (a) an elastomer, and (b) at least one cure accelerator, this second rubber compound having a $t_s2$ value of at least 1.5 minutes when measured at 190° C.; and (3) one or more optional additional rubber compound comprising (a) at least one elastomer, this optional additional rubber compound having a $t_s2$ value of at least 1.5 minutes when measured at 190° C.;

wherein:

the elastomer (1)(a) and the elastomer (2)(a) are the same, or belong to the same family of elastomers, and the vulcanizing agent (1)(b) and the accelerator (2)(b) together function as a cure system for the elastomers (1)(a) and (2)(a), the elastomer (3)(a) is the same elastomer as one or both of the elastomer (1)(a) and the elastomer (2)(a), or may belong to the same family of elastomers as the elastomer (1)(a) and (2)(a), or the elastomer (3)(a) may be different from the elastomers (1)(a) and (2)(a) and not belong to the same family as elastomers (1)(a) and (2)(a), provided that the elastomer (3)(a) is curable by the cure system comprising the vulcanizing agent (1)(b) and the accelerator (2)(b) and/or the elastomer (3)(a) forms a stable dispersion with the elastomers (1)(a) and (2)(a), at least one elastomer selected from the group consisting of the elastomer (1)(a), the elastomer (2)(a) and the elastomer (3)(a) has a Mooney viscosity in the range of 20-75, preferably 20-50, and more preferably 30-50, as measured at 100° C. in accordance with ASTM D1646, the first rubber compound, the second rubber compound and the optional additional rubber compound are kept separate from each other until the fast-curing vulcanizable multi-part rubber compound is used, a blend of equal volume parts of the first rubber compound and the second rubber compound, optionally with an equal volume part of the optional additional rubber compound, has a $t_s2$ value of less than 0.7 minutes, each $t_s2$ value being measured with an oscillating disk rheometer (ODR) in accordance with ASTM D2084.

Each of the first rubber compound, the second rubber compound, and the optional additional rubber compound which form the fast curing vulcanizable multi-part rubber compound of the invention may be formulated according to the following general composition:

| | |
|---|---|
| Elastomer(s) | 100 parts per hundred by weight (phr) |
| Filler(s) | 0-150 phr, preferably 40-85 phr |
| Additive(s) | 0-6 phr, preferably 2-4 phr |
| Cure system | 1-20 phr, preferably 4-12 phr for the first and second rubber compounds |
| | 0-20 phr, preferably 4-12 phr for the optional additional rubber compound |

The cure system for the first rubber compound comprises the vulcanizing agent (1)(b) and no accelerator. The cure system for the second rubber compound comprises the cure accelerator (2)(b) and no vulcanizing agent. The optional additional rubber compound may contain no cure system, or may contain a cure system comprising a vulcanization agent with no accelerator, or a cure accelerator with no vulcanizing agent. The vulcanizing agent in the optional additional rubber compound may be the same as or different from the vulcanizing agent (1)(b). The cure accelerator in the optional additional rubber compound may be the same as or different from the cure accelerator (2)(b).

In the fast curing multi-part vulcanizable rubber compound according to the invention, the elastomer (3)(a) in the optional additional rubber compound may be the same elastomer as one or both of the elastomer (1)(a) of the first rubber compound and the elastomer (2)(a) of the second rubber compound. Alternatively, the elastomer (3)(a) may belong to the same family of elastomers as the elastomer (1)(a) and (2)(a), or the elastomer (3)(a) may be different from the elastomers (1)(a) and (2)(a) and not belong to the same family as elastomers (1)(a) and (2)(a), provided that the elastomer (3)(a) is curable by the cure system comprising the vulcanizing agent (1)(b) and the accelerator (2)(b) and/or the elastomer (3)(a) forms a stable dispersion with the elastomers (1)(a) and (2)(a).

Examples of combinations of elastomers curable by the same cure system include:
NBR and SBR
HNBR and EVA
EPDM and CR
ECO and ACM (halogen cure type).

Examples of combinations of elastomers which form stable dispersions include:
ACM and EVA
ECO and ACM (non-halogen cure type)
ACM (non halogen type), ECO and EPDM.

The master batch composition of the optional additional rubber compound may be the same as, or may differ from the masterbatch composition of the first rubber compound or the masterbatch composition of the second rubber compound.

The first rubber compound may contain optionally one or more other elastomer in addition to the elastomer (1)(a). Similarly, the second rubber compound may contain optionally one or more other elastomer in addition to the elastomer (2)(a), and the optional additional rubber compound may contain optionally one or more other elastomer in addition to the elastomer (3)(a). When the first rubber compound, the second rubber compound or the optional additional rubber compound contains such other elastomer, that other elastomer is curable by the cure system comprising the vulcanizing agent (1)(b) and the accelerator (2)(b) and/or that other elastomer forms a stable dispersion with the elastomers (1)(a), (2)(a) and (3)(a). The combinations of elastomers curable by the same cure system and the combinations of elastomers which form stable dispersions include the example mentioned in the above description of the elastomer (3)(a).

In the above composition, the cure system is one which is suitable for the elastomers (1)(a), (2)(a) and (3)(a), and is divided between the first and the second rubber compounds so that the first rubber compound contains a vulcanizing agent, and the second rubber compound contains an accelerator. This cure system optionally may have other components, for example a retarder, in addition to the vulcanizing agent and the accelerator.

Each of the first rubber compound, the second compound, and the optional additional rubber compound may be prepared by processes known in the art using standard equipment and procedures. Each of these rubber compounds may contain additives suitably selected by one of ordinary skill in the art, which may include but are not limited to antioxidants, antiozonants, lubricants, process aids, activators, oils, plasticizers, etc.

In the fast curing vulcanizable multi-part rubber compound of the invention, the first rubber compound, the second rubber compound and the optional additional rubber compound may be present in equal amounts by volume, or in different amounts by volume. For convenience of use and ease in achieving a uniform blend in the injection molding process, the rubber compounds may be used in equal amounts in the multi-part rubber compound of the invention, but their volumes are not limited and may be selected by one of ordinary skill in the art to suit the particular application. For example, for 100 volume parts of the first rubber compound, the amount of the second rubber compound may be 2-150 volume parts, preferably 10-130 volume parts, and more preferably 80-120 volume parts. Similarly, the amount of the optional additional rubber compound may be 2-150 volume parts, preferably 10-130 volume parts, and more preferably 80-120 volume parts.

The following is an example of a general composition for a two-part fast curing vulcanizable rubber compound according to the invention. In this example the first rubber compound and the second rubber compound contain the same elastomer, and have the same masterbatch composition, expressed in weight parts. The first rubber compound contains the accelerator and the second rubber compound contains the vulcanizing agent. However, in other embodiments, the first rubber compound and the second rubber compound may have different masterbatch compositions even though they contain the same elastomer. In yet other embodiments, the elastomers may be different from each other but belong to the same family. For example, the elastomer (1)(a) may be an acrylate rubber, and the elastomer (2)(a) may be another acrylate rubber.

|  | First rubber compound | Second rubber compound |
|---|---|---|
| Elastomer | 100 | 100 |
| Carbon black | 50 | 50 |
| Process aids | 3 | 3 |
| Master batch total | 153 | 153 |
| Accelerator | 8 | -0- |
| Vulcanizing agent | -0- | 4 |
| Total | 161 | 157 |

The following are examples of fast curing vulcanizable two-part rubber compounds according to the invention. This list is not exhaustive. A rubber compound in which the cure system may be separated into two or more parts to prevent premature curing may be used as the basis for the fast curing vulcanizable two-part or multi-part rubber compound according to the invention.

| Elastomer (1)(a) & (2)(a) | Accelerator | Vulcanizing agent |
|---|---|---|
| ACM | Quaternary ammonium salts | Sodium stearate |
| NBR | Carbamates | Sulfur |
| HNBR | Co-agents[1] | Low temperature peroxide |
| ECO | Base | Triazine compounds |
| FKM | Co-agents[1] | Low temperature peroxides |
| AEM | Base | Low MW diamines |
| EPDM | Co-agents[1] | Low temperature peroxide |

[1] A co-agent is a monomeric compound which enhances crosslinking in a free radical cure system. Examples of a co-agent are zinc monomethacrylate and ethylene glycol dimethacrylate.
ACM = acrylate rubber comprising units of an acrylic ester monomer, optionally with units of comonomers
NBR = nitrile rubber comprising units of acrylonitrile and butadiene monomers
HNBR = hydrogenated nitrile rubber, obtained by hydrogenating NBR rubber
ECO = epichlorohydrin rubber comprising units of epichlorohydrin monomer and units of ethylene oxide monomer
FKM = fluorocarbon rubber comprising units of fluoromonomers
AEM = acrylic ester/ethylene copolymer rubber comprising units of acrylic ester monomer and units of ethylene monomer
EPDM = ethylene-propylene diene terpolymer rubber comprising units of ethylene, propylene and diene monomers.

The multi-part rubber compound and the process of the invention are particularly useful for compounding and injection molding elastomer systems which present the dual challenge of being scorchy as well slow curing. ACM rubber in particular is very susceptible to scorch and is also slow to cure, so it is ideally suitable for compounding and injection molding according to the invention.

In the fast curing vulcanizable multi-part rubber compound according to the invention, the optional additional rubber compound provides a mechanism for fine tuning the properties of the multi-part rubber compound and the properties of a product molded from the compound. The optional additional rubber compound may be used, for example, to bring an additional accelerator or curing agent into the multi-part compound, or to introduce a colorant, another filler, or another additive such as a bond promoter to enhance bonding between the rubber compound and another material such as a metallic or plastic material in an article molded from the compound.

Figure 1:
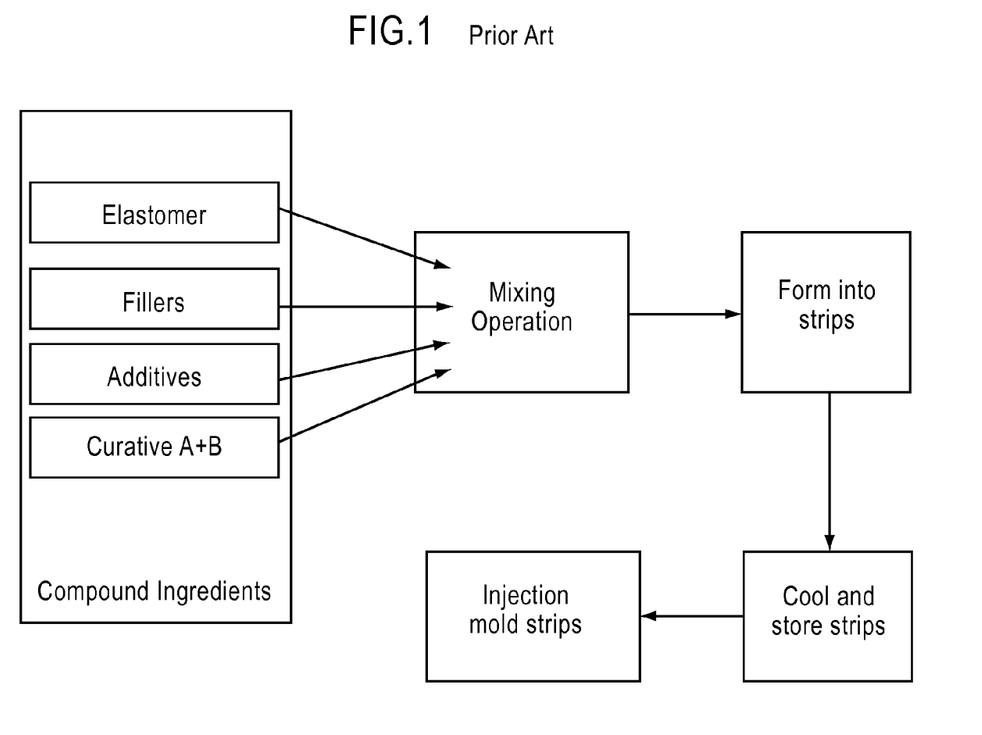
FIG. 1 is a flowchart of rubber processing and injection molding according to the prior art.

FIG. 1 is a flow chart of the processing of a rubber compound for injection molding according to the prior art. The elastomer is compounded with fillers, additives and a curative (A+B), then formed into strips (or pieces of some other shape such as strands or rods). The strips are cooled and stored until they are used in an injection molding process.

Figure 2:
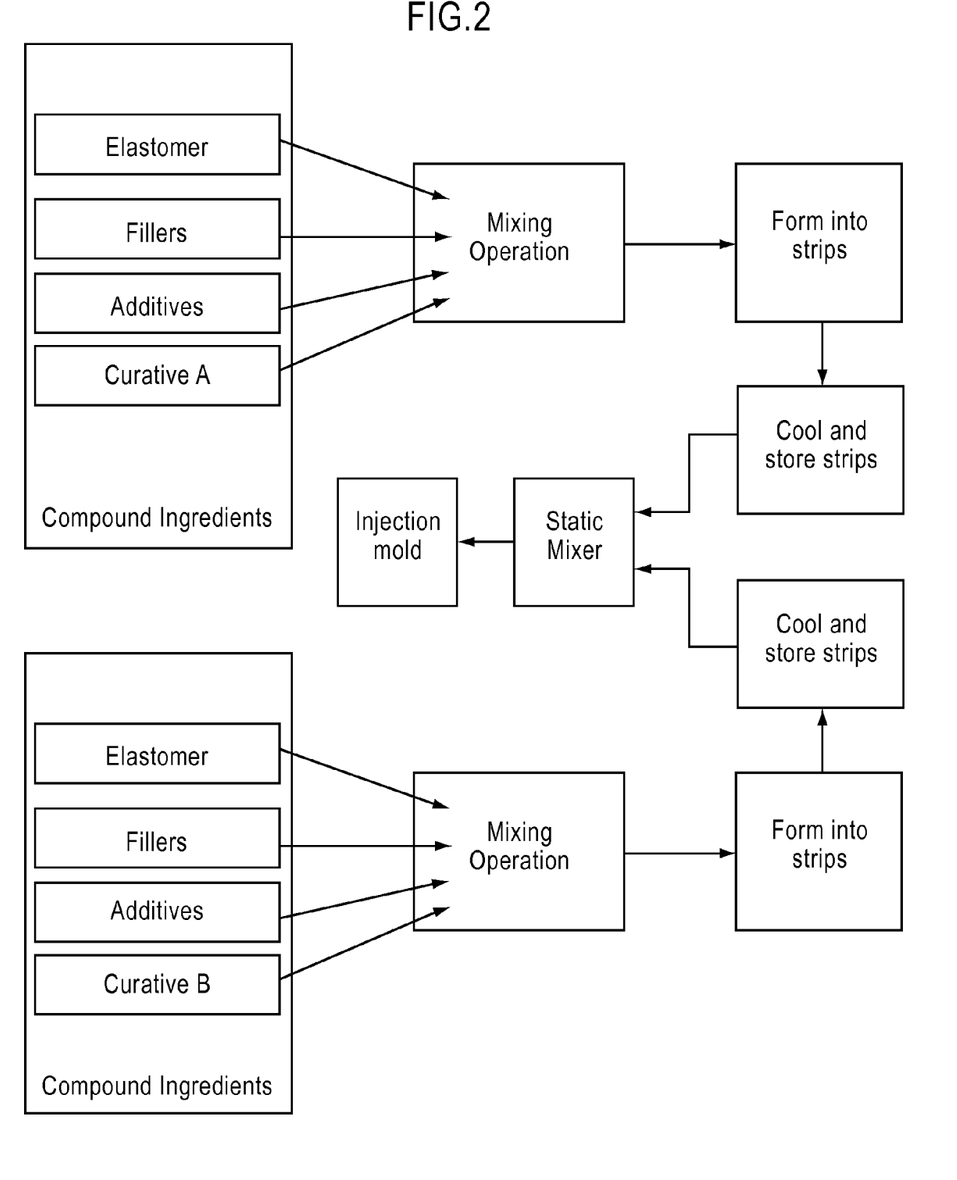
FIG. 2 is a flowchart of an embodiment of the process of the invention.

FIG. 2 shows the processing and injection molding of a rubber compound according to the invention. In one operation, the elastomer is compounded with fillers, additives, and component A of the curative (A+B). The obtained strips (or pieces of other shape such as strands or rods) of this first rubber compound are cooled and stored. In a parallel and separate operation, the elastomer is compounded with fillers, additives, and component B of the curative (A+B). The obtained strips (or pieces of other shape such as strands or rods) of this second rubber compound are cooled and stored. The first rubber compound and the second rubber compound together constitute a fast curing vulcanizable two-part rubber compound according to the invention. When this two-part rubber compound is molded by injection according to the invention, strips (or pieces of other shape such as strands or rods) of the first rubber compound and strips (or pieces of other shape such as strands or rods) of the second rubber compound are simultaneously fed by the injection process into a static mixer where they are blended and the resultant blend is delivered to the injection mold.

Figure 3:
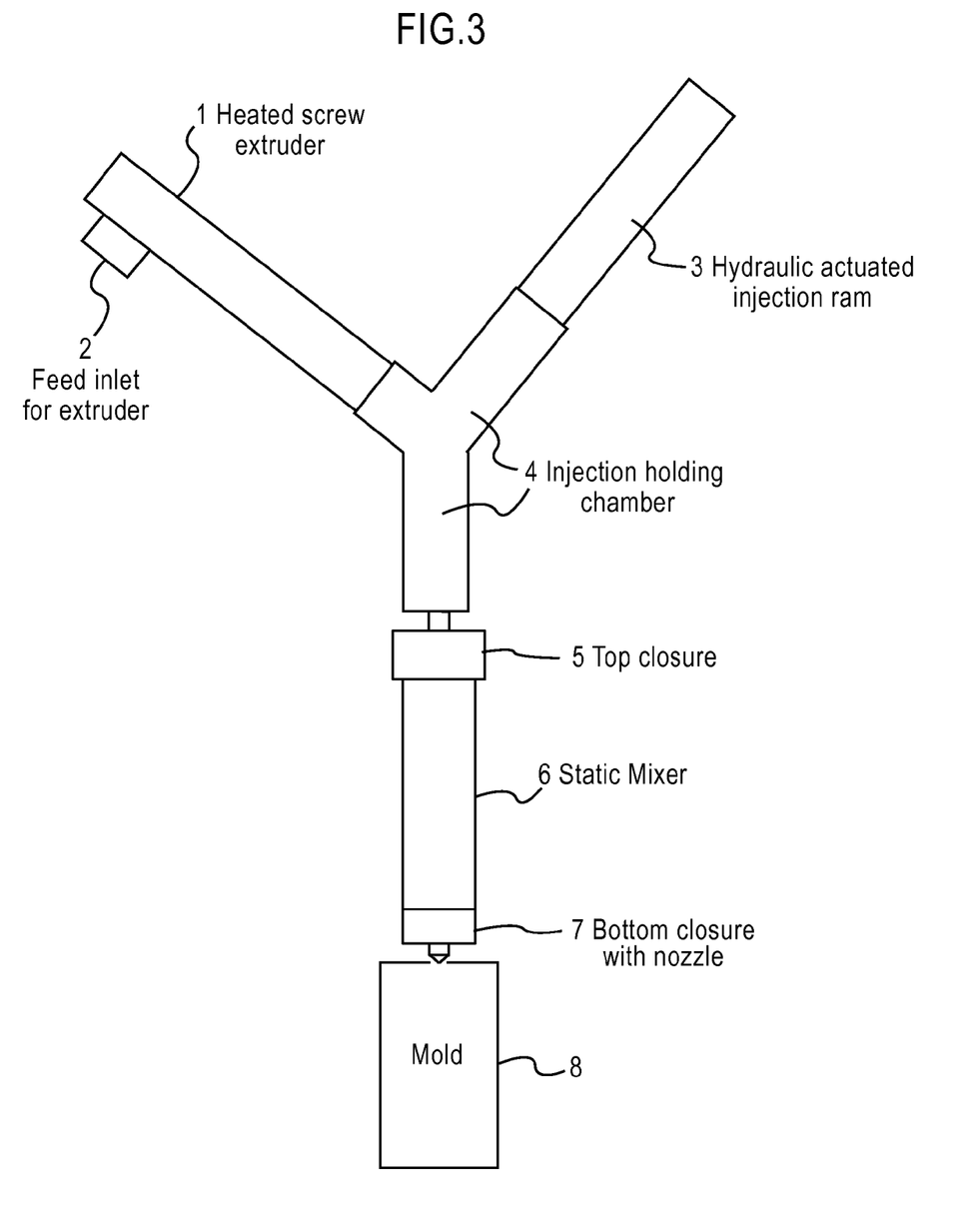
FIG. 3 is a schematic view of an embodiment of an apparatus for practicing the process of the invention.

FIG. 3 shows schematically an apparatus for blending and injection molding of a two-part rubber compound according to the invention. Strips (or pieces of other shape such as strands or rods) of the first rubber compound, strips (or pieces of other shape such as strands or rods) of the second rubber compound, and optionally strips (or pieces of other shape such as strands or rods) of the additional rubber compound, are fed simultaneously and continuously at the same rate into a heated screw extruder (1) through feed inlet (2) into the warm-up or injection holding chamber (4) of an injection press. The volume of the strip (or piece of other shape such as strand or rod) of the first rubber compound may be the same as or different from the volume of the strip (or piece of other shape such as strand or rod) of the second rubber compound, and the optional additional rubber compound, i.e., the cross-sections of the strips (or pieces of other shape such as strands or rods) may be the same or may be different.

The warm-up or injection holding chamber does not feed directly into the mold or cold runner block of the press as in traditional injection molding. Instead, the mixture of rubber compounds is forced from the injection holding chamber by the pressure generated from the hydraulic actuated injection ram (3) into a motionless mixer (or static mixer)(6) connected by a threaded top closure (5) to the exit of the injection holding chamber. The two streams (or multiple streams) of rubber compounds are blended while being forced through the motionless mixer before being injected into the mold (8) from the bottom closure of the static mixer which is provided with an integral nozzle (7).

The injection press is operated at a high pressure sufficient for obtaining uniform blending of these rubber compounds which have high viscosities. This pressure is much higher than the pressure required for injection molding of thermoplastic materials or elastomers having low viscosities. The injection pressure is at least 10,000 psi. Depending on the nature of the rubber compounds and the volume of the press, the injection pressure may be in a range as high as from 10,000 to 25,000 psi or even from 10,000 to 45,000 psi.

Motionless Mixer

Motionless or static mixers are known devices having no moving parts which achieve blending of materials forced through stationary mixing elements provided in the mixer. The mixing elements are shaped with protrusions and/or openings and channels which guide the flow of materials and force the flow to divide then recombine in successive patterns, as a result of which the materials are blended. Motionless mixers are typically used for blending materials such as plastics which are not chemically reactive and do not have a high viscosity at the mixing temperature. The use of a static mixer to mix a two-liquid addition type liquid-like silicone rubber for injection molding is reported in JP 2000-263594A and US 2003/0057606 A1. However, static mixers have not been considered suitable for blending materials of high viscosity such as the rubber compounds according to the invention, particularly when the blending of those rubber compounds is complicated by the fact that they cure quickly when brought into contact with each other, which curing is accelerated by the heat produced by shear and friction associated with the high viscosity of the rubber compounds being forced under high pressure through the static mixer.

Figure 4:
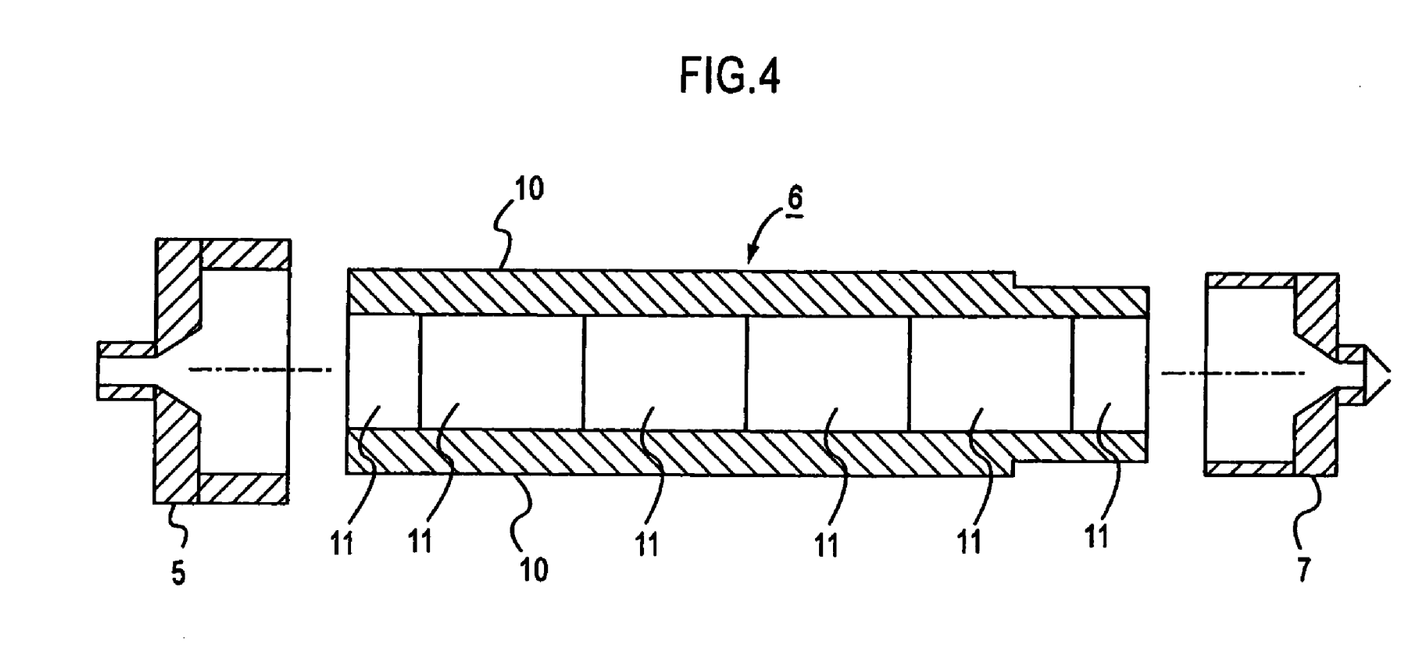
FIG. 4 is a schematic view of an embodiment of a static mixer assembly for use in the process of the invention.

The inventors have discovered and established that it is possible to blend a fast curing vulcanizable multi-part rubber compound in a static mixer for injection molding of the rubber compound. FIG. 4 shows a motionless mixer (6) which may be used in the process of the invention. The mixer comprises a housing (10) containing a plurality of mixing elements (11) combined in series in the longitudinal direction of the housing. The motionless mixer is attached directly to the injection gun of an injection molding press by a threaded top closure (5), and is provided with a bottom closure having an integrated nozzle (7) linking the mixer to the mold of the press. The components of the motionless mixer, in particular the housing (10), the top closure (5) and the bottom closure having an integrated nozzle (7), are constructed of material capable of withstanding the very high pressures, usually in excess of 10,000 psi, generated by injection presses. Hardened metal alloys are examples of materials suitable for this purpose. A number of metal alloys may be hardened for construction of the components of the motionless mixer, with ANSI 4140 being particularly suitable as a base metal alloy which can be hardened to a Rockwell C hardness from 20 to 67, preferably from 25 to 45, after being fabricated into components for the mixer.

The motionless mixer efficiently mixes elastomeric compositions of high viscosity such that, once processed through the mixer, the resultant mix is sufficiently homogenous so as to achieve a uniform vulcanization state. Each mixing element has multiple openings or orifices in the portion of the mixing element facing upstream of the flow of elastomer compounds in the mixer. These openings or orifices lead to channels inside the mixing element which are configured to force the streams of elastomer compounds to split up and rejoin successively, resulting in successively increased blending of the elastomer compounds forced through the mixing element by the high pressure used in the injection press. The streams of elastomer compounds exiting the portion of the mixing element facing downstream of the injection flow are fed into the next adjacent mixing element, where further blending as in the first mixing element is carried out. The number of mixing elements provided in the mixer housing range from 2 to 40, depending on the design of the mixing elements and the viscosities of the rubber compounds to be blended and the injection pressure. The number of mixing elements is selected to produce a uniform stream of the blended rubber compounds at the exit of the mixer without blending beyond that stage which may cause premature vulcanization.

Figures 5A, 5B:
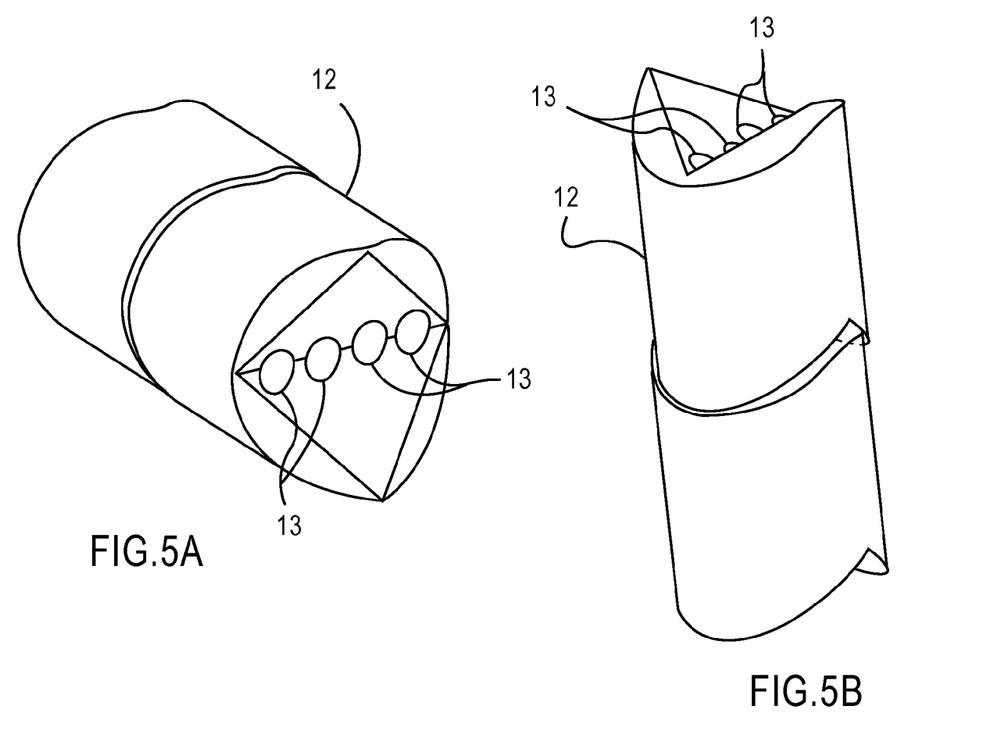
FIG. 5A is a perspective view from the upstream facing end of two adjacent mixing elements in an embodiment of a static mixer assembly for use in the process of the invention.
FIG. 5B is a perspective view of the side of two adjacent mixing elements in an embodiment of a static mixer assembly for use in the process of the invention.
Figure 5C:
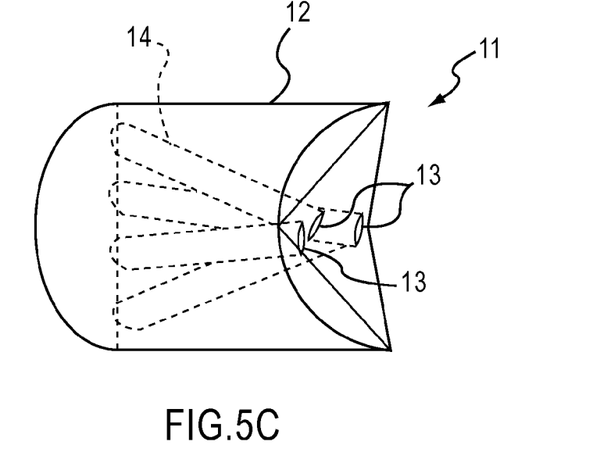
FIG. 5C is a side view of one mixing element showing the paths of the channels inside the mixing element.

Motionless mixers currently available commercially are not made of material that can withstand the high pressures required for blending of elastomers having the high viscosities used in the invention. Therefore, the inventors had a motionless mixer manufactured to their specifications which included a mixer housing in the form of a cylindrical tube cast of an alloy material which is hardened to the required hardness. Commercially available mixing elements for motionless mixers may be used to populate the mixer housing. If necessary, depending on the design and material of commercially available mixers and also depending on the viscosity of the elastomers being blended and the pressure of the injection molding process, known mixing elements may be fabricated from a material of greater hardness. Examples of designs of motionless mixing elements which may be used to populate the housing of the motionless mixer include the Ross ISG mixer elements available from Ross Systems and Controls, and the KSM mixer elements available from Sulzer Chemtech. The design of a mixing element which may used in the invention, i.e., the Ross ISG mixing element, is shown in FIGS. 5A, 5B and 5C. At each end of the body (12) of the mixing element, openings (13) lead to channels (14) which traverse the mixer element from end to end. The rubber compound is forced by the high pressure exerted by the injection press through the channels of one mixing element into the channels of the next adjacent mixing element, and is blended as a result of the splitting and recombination of the flow of rubber compound imposed by the design and pattern of the channels of the mixing element.

Injection Molding Process

As described above, the multi-part rubber compound is fed in strips (or pieces of other shape such as strands or rods), for example by means of a transfer screw, into a warm-up or injection holding chamber of the injection press. Minimal mixing takes place during this operation, and the multi-part rubber compound is warmed up by mechanical friction due to its transport, as well as heating means such as a heating jacket provided on the injection press. This mixture can reside in the warm-up/injection holding chamber for up to five cycles depending on how much rubber compound is needed to produce the article to be molded. Upon injection, the mixture is forcibly pushed under high pressure through the motionless mixer where the mixture is uniformly blended before it is injected through a nozzle provided at the end of the motionless mixer into the mold where the mixture is formed into a molded part and vulcanized.

The injection molding process may be carried out in a commercially available injection molding apparatus or injection molding press modified by inserting between the warm-up or injection holding chamber and the mold a motionless mixer meeting the requirements described above.

The following examples further illustrate aspects of the invention but do not limit the invention. Unless otherwise indicated, all parts, percentages, ratios, etc., in the examples and in the rest of the specification are in terms of weight.

EXAMPLE 1

Each of the rubber compounds shown in Table 1 was prepared in an internal mixer and was extruded into a cylindrical strand using an extruder. The first compound and the second compound are constituents of a fast curing vulcanizable two-part rubber compound according to the invention. The non post cure compound is a comparable one-part prior art compound which has the same masterbatch composition as the first and second compounds, but contains in addition a retarder to delay vulcanization and prevent scorch.

TABLE 1

|  | First compound (wt parts) | Second compound (wt parts) | Non Post Cure Compound (wt parts) |
|---|---|---|---|
| HYTEMP 4065[a] | 100.00 | 100.00 | 100.00 |
| N550[b] carbon black | 65.00 | 65.00 | 65.00 |
| Stearic acid[c] | 1.00 | 1.00 | 2.00 |
| STRUKTOL WB222[d] | 2.00 | 2.00 | 2.00 |
| VANOX CDPA[e] | 2.00 | 2.00 | 2.00 |
| HYTEMP NS-70[f] | 12.00 | -0- | 6.00 |
| HYTEMP NPC-50[g] | -0- | 4.00 | 2.00 |
| HYTEMP SR50[h] | -0- | -0- | 2.00 |

[a] acrylate rubber (Zeon Chemicals L.P.)
[b] Cabot Corporation
[c] C. P. Hall
[d] process aid (Struktol Company of America)
[e] antioxidant (R T Vanderbilt)
[f] curing agent (Zeon Chemicals L.P.)
[g] fast cure system containing accelerator (Zeon Chemicals L.P.)
[h] retarder (Zeon Chemicals L.P.)

The cure properties of each of the first compound, second compound, and the non post cure compound were measured with a Monsanto R100 Oscillating Disk Rheometer at 190° C. The same measurements were also made on:
1. a blend of the first and second compounds blended in an open mill,
2. a sample of the two-part compound according to the invention taken at the exit of the static mixer in an injection process according to the invention (using a M36 REP 76 ton injection press), and allowed to cool to room temperature to facilitate testing.

The results are shown in Table 2.

TABLE 2

| Rheometer Properties (ODR Measured @ 190° C.) | | | | | |
|---|---|---|---|---|---|
|  | First compound | Second compound | Non Post Cure (prior art single-part compound) | (First + Second) blended | (First + Second) post mixer |
| Minimum torque $M_L$ | 7.8 | 9.4 | 9.3 | 9.5 | 11.8 |
| Maximum torque $M_H$ | 30.5 | 18.6 | 38.2 | 42.4 | 49.5 |
| $t_S 2$ | 2.8 | 2.9 | 0.7 | 0.5 | 0.5 |
| t'90 | 24.5 | 23.6 | 4.7 | 4.7 | 4.9 |

Tested at 30 minutes (to give each compound sufficient time to cure so the time dependent values such as $t_S 2$ and t'90 can be calculated).
ODR testing carried out in accordance with ASTM D2084.

As seen from Table 2, each of the first and second compounds has cure properties that would be considered too slow for an economical injection molding cycle. When measured by the ODR at injection molding cure temperatures of 190° C., the $t_s 2$ value indicates that cure does not begin for nearly three minutes. An ideal compound, rather than just beginning to cure, would be almost completely cured within this time frame. Using the ODR t'90 time as a guide, either of the first or second compounds would require a minimum of ten minutes cure time before removal from the press would be attempted. Clearly such a long press cure time is economically unacceptable.

The blend of the first and second compounds (blended on an open mill) shows a short $t_s 2$ and a lower t'90 which is an indication of a fast cure.

The results show that the sample of the multi-part compound taken at the exit of the motionless mixer and allowed to cool to room temperature is fast curing. However, these measurements are not even a true representation of the multi-part compound because the compound was allowed to cool off after the parts were blended before these measurements were taken. The multi-part compound is actually even more fast-curing than indicated by the values shown in the above table when the multi-part compound is delivered immediately from the exit of the static mixer into the cavity of a heated mold.

The two-part rubber compound prepared according to the invention in Example 1 was injection molded in a M36 REP 76 ton injection press provided with a static mixer as shown in FIG. 4, in which 6 mixing elements made as described above according to the design of the Ross ISG mixer with 316 stainless steel are assembled in series inside a housing made with ANSI 4140 alloy and hardened to a Rockwell C hardness of 40. The injection pressure imparted on the rubber compound was approximately 24,500 psi, at an extruder temperature of 50° C., an injection holding chamber temperature of 60° C., a mixer temperature of 60° C., and a mold temperature of 190° C., and with a cycle time of about 1:20 minutes (compared to a cycle time of about 2:20 minutes for molding the non post cure prior art compound.) The spider mold flow test specimen obtained by the injection molding of the two-part compound according to the invention exhibited excellent properties. The molded test specimen was readily released from the mold. It did not deform, which is an indication that it was not under-cured; and it was not brittle, which is an indication that it was not over-cured.

EXAMPLE 2

The two-part compound shown in Table 3 is prepared and processed in the same manner as in Example 1.

TABLE 3

|  | First compound (wt parts) | Second compound (wt parts) |
|---|---|---|
| ZETPOL 2010L[a] (HNBR) | 100 | 100 |
| N550 carbon black[b] | 40 | 40 |
| Stearic acid[c] | 1 | 1 |
| KADOX 911C zinc oxide[d] | 5 | 5 |
| VAROX DBPH-50[e] | -0- | 10 |
| VANOX MBM 4[f] | 4 | -0- |
| TOTAL | 150 | 156 |

[a] Zeon Chemicals L.P.
[b] Cabot Corporation
[c] C. P. Hall
[d] Horsehead
[e,f] R. T. Vanderbilt The fast curing vulcanizable multi-part rubber compound of the invention is useful for molding any rubber article, in particular by injection molding. The rubber compounds according to the invention wherein the elastomers are acrylate rubber are particularly useful for molding automotive parts that require high heat resistance and weather resistance, for example O-rings, oil pan gaskets, front cover gaskets, valve cover gaskets, oil seals, bonded piston seals, etc.

The fast curing multi-part rubber compound of the invention has the following advantages: reduction of cycle times in injection molding, reduction of post cure time, with the possibility that no post cure is required at all; and improved shelf life.

It is possible to select combinations of vulcanization agents and accelerators which exhibit cure rates that are so rapid that they cannot be used in rubber compounds mixed according to conventional methods. Another unexpected benefit of the multi-part rubber compounds of the invention is that they exhibit better flow, so that they require less time to fill the cavity of a mold, as compared to a comparable one-part rubber compound which contains the same rubber components with the addition of a retarder to prevent premature vulcanization.

This invention makes possible the use of curative combinations which would be normally considered too fast for conventional injection molding. In injection molding or other processing of rubber, the balance between scorch safety and cure rate is critical. If a compound is fast curing, it is fast curing at all temperatures, even at the temperatures of the process steps which precede the actual molding step, which temperatures are lower than the molding temperature. A compound must be fast curing enough to be useful for molding articles economically, but slow enough to survive the required processing without premature vulcanization. This invention achieves a reduction of the amount of time the cure ingredients are together, thus minimizing processing time, and consequently makes possible the use of more reactive components.

Other embodiments of the present invention will be apparent to those skilled in the art from consideration of the specification and practice of the invention disclosed herein. It is intended that the specification and examples be considered as illustrative only, with the true scope and spirit of the invention being indicated by the following claims.

The invention claimed is:

1. A process for blending, injection molding and curing of a rubber compound, comprising the steps of:
   (a) feeding simultaneously separate streams of a first rubber compound, a second rubber compound, and optionally one or more additional rubber compound into an injection chamber of an injection press where the streams of rubber are combined;
   (b) injecting a stream of combined rubber compounds resulting from step (a) from the injection chamber at a pressure of at least 10,000 psi into a motionless mixer sealedly provided downstream of the injection chamber, wherein the stream of combined rubber compounds is forced to split up and rejoin successively as the stream advances through the motionless mixer, resulting in successively increased blending of the rubber compounds to form a blended rubber stream; and
   (c) feeding the blended rubber stream into a mold sealedly provided downstream of the motionless mixer,
   wherein
      (1) the first rubber compound comprises (a) an elastomer and (b) at least one vulcanizing agent,
      (2) the second rubber compound comprises (a) an elastomer and (b) at least one cure accelerator, and
      (3) the one or more optional additional rubber compound comprises (a) at least one elastomer,
   wherein
   the elastomer (1)(a) and the elastomer (2)(a) are the same, or belong to the same family of elastomers, and the vulcanizing agent (1)(b) and the cure accelerator (2)(b) together function as a cure system for the elastomers (1)(a) and (2)(a), the first rubber compound comprising no cure accelerator (2)(b) and the second rubber compound comprising no vulcanizing agent (1)(b), and at least one elastomer selected from the group consisting of the elastomer (1)(a), the elastomer (2)(a) and the elastomer (3)(a) has a Mooney viscosity in the range of 20-75 as measured at 100° C. in accordance with ASTM D1646.

2. A process for blending, injection molding and curing of a rubber compound as in claim 1, wherein at least one elastomer selected from the group consisting of the elastomer (1)(a), the elastomer (2)(a) and the elastomer (3)(a) has a Mooney viscosity in the range of 20-50 as measured at 100° C. in accordance with ASTM D1646.

3. A process for blending, injection molding and curing of a rubber compound as in claim 1, wherein at least one elastomer selected from the group consisting of the elastomer (1)(a), the elastomer (2)(a) and the elastomer (3)(a) has a Mooney viscosity in the range of 30-50 as measured at 100° C. in accordance with ASTM D1646.

4. A process for blending, injection molding and curing of a rubber compound as in claim 1, wherein the combined streams of rubber are injected from the injection chamber at a pressure in the range from 10,000 to 45,000 psi.

5. A process for blending, injection molding and curing of a rubber compound as in claim 1, wherein the combined streams of rubber are injected from the injection chamber at a pressure in the range from 10,000 to 25,000 psi.

* * * * *